(12) United States Patent
Wang et al.

(10) Patent No.: US 10,870,162 B2
(45) Date of Patent: Dec. 22, 2020

(54) ADAPTIVE CONTROL METHOD AND EQUIPMENT OF ARC SWING IN NARROW GAP WELDING

(71) Applicant: JIANGSU UNIVERSITY OF SCIENCE AND TECHNOLOGY, Zhenjiang (CN)

(72) Inventors: Jiayou Wang, Jiangsu (CN); Jie Zhu, Jiangsu (CN); Na Su, Jiangsu (CN); Maosen Yang, Jiangsu (CN); Wenhang Li, Jiangsu (CN)

(73) Assignee: JIANGSU UNIVERSITY OF SCIENCE AND TECHNOLOGY, Zhenjiang (HK)

( * ) Notice: Subject to any disclaimer, the term of this patent is extended or adjusted under 35 U.S.C. 154(b) by 671 days.

(21) Appl. No.: 15/534,005

(22) PCT Filed: Jun. 30, 2015

(86) PCT No.: PCT/CN2015/082903
§ 371 (c)(1),
(2) Date: Jun. 8, 2017

(87) PCT Pub. No.: WO2016/090903
PCT Pub. Date: Jun. 16, 2016

(65) Prior Publication Data
US 2018/0147647 A1 May 31, 2018

(30) Foreign Application Priority Data

Dec. 9, 2014 (CN) .......................... 2014 1 0741503

(51) Int. Cl.
*B23K 9/095* (2006.01)
*B23K 9/173* (2006.01)
(Continued)

(52) U.S. Cl.
CPC .......... *B23K 9/0953* (2013.01); *B23K 9/0213* (2013.01); *B23K 9/0956* (2013.01);
(Continued)

(58) Field of Classification Search
CPC .. B23K 9/0213; B23K 9/0953; B23K 9/0956; B23K 9/1087; B23K 9/1274;
(Continued)

(56) References Cited

U.S. PATENT DOCUMENTS

| 4,951,218 A | * | 8/1990 | Okumura | B23K 9/0956 219/124.34 |
| 2010/0133239 A1 | * | 6/2010 | Gunzelmann | B23K 9/0213 219/73 |

FOREIGN PATENT DOCUMENTS

| CN | 101412143 | 4/2009 |
| CN | 101767242 | 7/2010 |

(Continued)

*Primary Examiner* — Dana Ross
*Assistant Examiner* — Joseph W Iskra
(74) *Attorney, Agent, or Firm* — Winston Hsu

(57) ABSTRACT

Disclosed are an adaptive control method and equipment of arc swing in narrow gap welding. The control equipment is composed of an infrared camera system, a computer image processing system, an arc swing parameter control system, a bent-conducting-rod-type swing arc torch and the like. The infrared camera system acquires, in an external triggering manner, an infrared image of welding area when an arc is deviated towards the left or the right side wall groove, extracts information about the width of the groove in real time after image processing by a computer, and calculates an arc swing angle target value. The arc swing parameter control system controls a motor drive mechanism to rotate a bent conducting rod, and drives the welding arc to conduct circular arc swing according to the swing angle target value, (Continued)

thereby realizing the adaptive control for the arc swing angle according to changes of the groove width.

10 Claims, 8 Drawing Sheets

(51) Int. Cl.
  *B23K 9/02* (2006.01)
  *B23K 9/10* (2006.01)
  *B23K 9/127* (2006.01)
(52) U.S. Cl.
  CPC .......... *B23K 9/1087* (2013.01); *B23K 9/1274* (2013.01); *B23K 9/173* (2013.01)
(58) Field of Classification Search
  CPC .............. B23K 9/173; H01L 21/02422; H01L 21/02425; H01L 21/02529; H01L 21/02532; H01L 21/02576; H01L 21/02579; H01L 21/02601; H01L 21/02628
  USPC .................................................... 219/130.01
  See application file for complete search history.

(56) References Cited

FOREIGN PATENT DOCUMENTS

| | | |
|---|---|---|
| CN | 102275029 | 12/2011 |
| CN | 102398100 | * 4/2012 |
| CN | 102814574 | * 12/2012 |
| CN | 104439620 | 3/2015 |
| JP | 10193126 | 7/1998 |
| JP | 2004268088 | 9/2004 |

* cited by examiner

| | When the arc swings to the left side wall of the groove | When the arc swings to the right side wall of the groove |
|---|---|---|
| Original infrared image before image processing and the position of the image capture window | 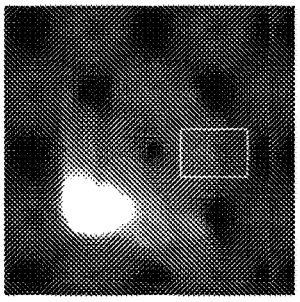 (a) | 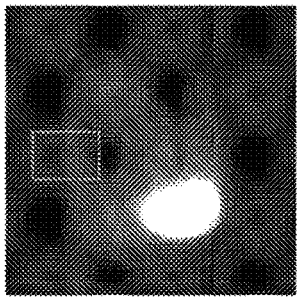 (b) |
| Image of the groove edge area captured by the small window | 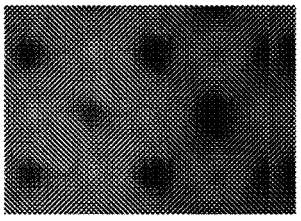 (c) | 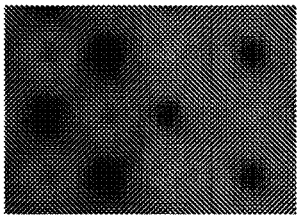 (d) |
| Image of the groove edge area after threshold processing | 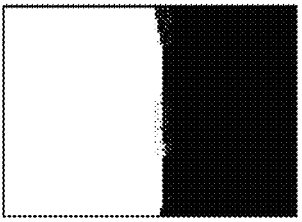 (e) | 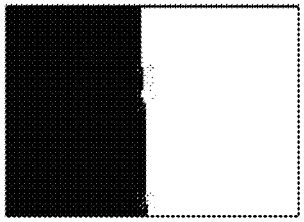 (f) |
| Image of the groove edge after edge extraction | 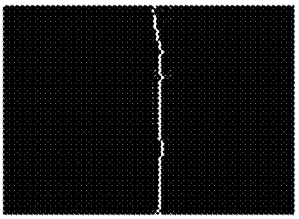 (g) | 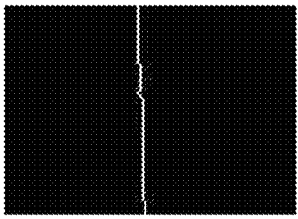 (h) |

FIG.8

ADAPTIVE CONTROL METHOD AND EQUIPMENT OF ARC SWING IN NARROW GAP WELDING

BACKGROUND OF THE INVENTION

1. Field of the Invention

The present invention relates to the field of welding technologies, and in particular, to a method and equipment for performing adaptive control on narrow gap welding arc movement in a condition of a variable groove width.

2. Description of the Prior Art

The narrow gap gas metal arc welding is an efficient, high-quality, and low-cost welding method. In an actual narrow gap welding process, affected by factors such as groove machining errors, workpiece assembly errors, and welding thermal deformation, the size of the groove width and central position of a welding seam may change. As a result, even if new processes such as a swing arc welding method, a high-speed rotating arc welding method, and a snakelike welding wire welding method are used to control side wall penetration of the groove, it cannot be ensured that the arc constantly heats the side walls of the groove uniformly and effectively. Meanwhile, it is also difficult to guarantee a stable welding seam height, thus affecting welding quality. For such a variable-groove welding problem in which the groove width changes, it is necessary to introduce an adaptive control mechanism for an arc position.

The Japanese Patent No. JP55048475A, which is entitled "Narrow Gap Automatic Welding Method", discloses that a wheel-type wire bending mechanism is used to enable a welding wire to generate a circular arc bending deformation in advance, and a motor drives a door-type swing mechanism through a worm-gear device, and drives an arc at an end of the welding wire in a circular arc bent state output from a central hole of a straight wire guide tip to conduct reciprocating swing in a narrow gap groove; meanwhile, the width of the groove is detected by using a tapered roller contact probe, and converted into an electrical signal by a potentiometer connected to the roller probe mechanism. Finally, a swing angle of the welding wire is controlled by the door-type swing mechanism, so as to be automatically adaptive to changes in the width of the groove. Disadvantages thereof are: 1) the wheel-type wire bending mechanism and the worm-gear swing mechanism are complex, and it is inconvenient to adjust a bending degree of the welding wire and an arc swing radius; 2) the mechanism of a welding wire pre-deformation and swing guide is far away from a protruding end of the welding wire, and therefore, after the welding wire is output from the contact tip, swing of the welding wire is poor in regularity; 3) the contact groove width sensing probe wears easily, and a sensing detection point is asynchronous with the position of the welding arc, leading to relatively low sensing precision; 4) the swing control device is poor in controllability, thus reducing the arc swing control precision.

In the Chinese Patent No. ZL200810236274.5, which is entitled "Swing Arc Narrow Gap Gas Metal Arc Welding Method And Device", a hollow axis motor is used to directly drive a micro-bend conducting rod to reciprocate around a central axis of a welding torch, driving the arc at an end of welding wire output from the central hole of the straight contact tip to conduct circular arc swing in a narrow gap welding groove, realizing swing arc narrow gap welding. This invention overcomes the disadvantages of the prior art described above. It is unnecessary to perform remote pre-deformation treatment on the welding wire; instead, tail end bend-guiding is directly provided for the welding wire by using a bent conducting rod, thereby simplifying the design of an arc swing mechanism, and moreover, swing of the welding wire is high in regularity, the arc has desirable directivity, and the arc swing control is highly precise. In addition, an arc swing radius can be conveniently adjusted by using bent conducting rods with different bending angles and bending lengths, so as to be adaptive to welding applications with different groove widths. A disadvantage of this invention is that: no specific implementation technical solution is provided for a common variable-groove narrow gap welding application, and it is difficult to put a variable-groove narrow gap welding process into practice.

SUMMARY OF THE INVENTION

In view of the disadvantages such as low extraction precision of the narrow gap groove width, low arc swing control precision, and poor welding environmental adaptability, the present invention proposes an adaptive control method and equipment for narrow gap welding arc swing, which is high in control precision, strong in engineering applicability, good in environmental adaptability, and easy to implement. Information about the groove width is detected according to an infrared visual sensor, and an arc swing angle is adjusted in real time by using a bent conducting rod swing arc torch, realizing adaptive control on the arc swing angle according to changes in the groove width.

The adaptive control equipment for narrow gap welding arc swing proposed by present invention employs the following technical solution: the equipment includes a narrow gap welding torch, an arc swing parameter control system, a computer image processing system, and an infrared camera system, where one end of a bent conducting rod in the narrow gap welding torch is connected to a motor drive and feed mechanism, and the other end is connected to a straight contact tip; a welding wire passing through the narrow gap welding torch extends into a to-be-welded groove with a variable groove width, to generate a welding arc; the infrared camera system includes a digital infrared camera and an infrared filter system; the computer image processing system includes an image acquisition card, a groove width extraction module, and a swing angle calculation module that are sequentially connected; the image acquisition card is connected to the infrared camera through a video line; the output of the swing angle calculation module is connected to the arc swing parameter control system; the arc swing parameter control system is connected to the motor drive and feed mechanism in the welding torch through a control line, and is separately connected to the infrared camera and the image acquisition card through a signal line.

The control method of the adaptive control equipment for narrow gap welding arc swing proposed by the present invention employs the following technical solution: the infrared camera system acquires an infrared image of welding area in an arc position external triggering manner, extracts information of groove width in real time after image processing by a computer, and calculates an arc swing angle target value according to the groove width; then, the arc swing parameter control system controls the motor drive and feed mechanism to directly rotate the bent conducting rod, and controls the arc to conduct, within the to-be-welded groove, swing along a circular arc trajectory with respect to the welding torch according to the target swing angle, realizing the adaptive control for the arc swing angle according to changes of in groove width.

Further, the control method of the adaptive control equipment for narrow gap welding arc swing according to the present invention further specifically includes the following steps:

① in the swing angle calculation module, after an arc swing radius r, a preserved process gap g, a groove width change determination threshold $TH_W$, and a groove width initial value $G_{s0}$ are preset, an initial swing angle $\alpha_0$ corresponding to the initial groove width $G_{s0}$ (which is considered as being equivalent to a sampling value at the position of an actual groove width $A_0B_0$) is calculated; then the welding torch and the infrared camera system move forward together at a welding speed $V_w$, and at the same time, the arc swing parameter control system controls, through the welding torch, the arc to conduct, within the to-be-welded groove, reciprocating swing along the circular arc trajectory with a swing angle of $\alpha_0$;

② the arc swing parameter control system sends an arc photographing and image acquisition triggering signal $P_A$ to the infrared camera and the image acquisition card according to a motor rotation position detection signal $P_M$ when the arc is deviated towards the left or the right side wall of the to-be-welded groove (or is located at the center of the groove), so that after the computer image processing system acquires the image of welding area, the width extraction module extracts the width of the groove in real time by means of image processing;

③ when the welding torch moves to any position of an actual groove width $A_iB_i$ (an actual sampling point ordinal number, the groove width extraction module extracts in real time a current detection value $G_i$ of the groove width at this position, calculates a median or mean of a total of n≥1 or i (when i<n) detection values of the groove width according to the current detection value and latest (n−1) (when or (i−1) (when i<n) detection values of the groove width that are previously obtained at other positions, to use the median or mean as a current sampling value $G_{si}$ of the groove width at $A_iB_i$, and then outputs the current sampling value $G_{si}$ to the swing angle calculation module;

④ the swing angle calculation module compares the current sampling value $G_{si}$ of the groove width with a previous sampling value $G_{s(i-1)}$, and if an absolute value of the difference $\Delta G_{si} \leq TH_w$, the arc swing angle $\alpha_i$ at the position where the actual groove width is $A_iB_i$ is not adjusted; otherwise, after the swing angle calculation module calculates the arc swing angle target value $\alpha_i$ at $A_iB_i$ according to the current sampling value $G_{si}$ of the groove width, the preserved process gap g, and the arc swing radius r, the arc swing parameter control system further drives the bent conducting rod through the motor drive and feed mechanism, and controls the arc to conduct swing along the circular arc trajectory with an angle of $\alpha_i$, so that at side wall stay points $D_i$ and $M_i$, distances from the arc to the sidewalls of the groove are separately equal to the set preserved process gap g; Step ② to Step ④ are repeated, till the welding process is finished.

The control method further includes:
In Step ①, the preserved process gap g is the shortest distance, in a direction perpendicular to the welding speed $V_w$, from the axis of the arc to the left and right side walls of the groove; the preset arc swing radius $r \geq (G_{max}-2g)/2$, where, $r=(a+b)\sin\beta+h\tan\beta$, $G_{max}$ is a possible maximum value of the groove width, a is the length of a bent part of the bent conducting rod (3) of the welding torch, b is the length of the straight contact tip (2) of the welding torch, h is the welding torch standoff height, and $\beta$ is a bending angle of the bent conducting rod (3); in Step ④, the groove width change determination threshold $TH_w \leq 0.5$ mm, and the swing angle $\alpha_i = \arc\sin\{(G_{si}-2g)/2r\}$.

In Step ②, method 1 of extracting the width of the groove in real time by the width extraction module is: when the arc is deviated towards the left side wall of the to-be-welded groove, adjusting an horizontal ordinate value of a positioning point of a right image capture window of the groove according to a horizontal position change of a right edge line of the groove, capturing a right-side image of the groove, extracting the right edge line of the groove, and a current distance $L_{1i}$ from the right edge line of the groove to a left boundary of a global image is obtained; when the arc is deviated towards the right side wall of the to-be-welded groove, adjusting an horizontal ordinate value of a positioning point of a left image capture window of the groove according to a horizontal position change of a left edge line of the groove, capturing a left-side image of the groove, extracting the left edge line of the groove, and a current distance $L_{2i}$ from the left edge line of the groove to the left boundary of the global image is acquired, and calculating a current detection value) of the groove width: $G_i = (L_{1i} - L_{2i})$.

In step ②, method 2 of extracting the width of the groove in real time by the width extraction module is: by processing a global welding image, extracting position coordinates of the highest point of arc area, determining ordinate values of positioning points of left and right image capture windows of the groove according to an ordinate value of the highest point, and adjusting horizontal ordinate values of the positioning points of the image capture windows according to horizontal position changes of edge lines of groove; after capturing, by using the right image capture window, an image including information about a right edge line of groove, calculating a current distance $L_{1i}$ from the right edge line of the groove to a left boundary of the global image; in the same image, after capturing, by using the left image capture window of the groove, an image including information about a left edge line of the groove, calculating a current distance $L_{2i}$ from the left edge line of groove to the left boundary of the global image, and calculating a current detection value of the groove width: $G_i = (L_{1i} - L_{2i})$.

In the method of extracting the groove width by the width extraction module in real time: an ordinate value of a detection point of the distance $L_{2i}$ from the left edge line of groove to the left boundary of the global image is the same as an ordinate value of a detection point of the distance $L_{1i}$ from the right edge line of groove to the left boundary of the global image, and the ordinate value is a median or mean of detection values at m (m≥1) positions on the edge lines of groove in the position-adaptive mobile image capture windows; when a small window image captured by the image capture window is processed, median filtering is performed first; then a gray-scale analysis is performed on the global image, to automatically search for peak and valley points of gray-scale distributions of a welding pool image and a background image and determine a threshold point; adaptive threshold segmentation processing is performed on the full window image using an Otsu method, and finally, the edge lines of groove are extracted by using a Canny edge detection operator; when the global welding image is processed, median filtering and contrast stretching processing are employed first; next, the contour of arc area is extracted after global fixed threshold segmentation is performed on the welding image; then, after morphological corrosion processing is performed on the contour of arc area, position coordinates of the highest point of arc area are extracted; it is recognized and determined, according to the arc photographing and image acquisition pulse triggering signal $P_A$ or an horizontal ordinate value of the highest point of arc area, whether the arc is deviated towards the left or the right side wall of the groove, or is at the center of the groove.

Compared with the prior art, the present invention has the following beneficial effects:

1) The width of the narrow gap groove is detected in real time in a non-contact manner by using an infrared camera, achieving desirable synchronization between a detection point and an arc position, high detection sensitivity and detection precision, and strong resistance against interference from welding spatter, welding fume, and arc light.

2) A bent conducting rod swing mechanism driven directly (or through a transmission pair) by a motor is employed, so that the arc has better directivity, control precision of an arc swing angle is higher, and meanwhile, the design of a welding torch is simplified.

3) An image of a groove edge area away from the arc side is captured by using a small window and processed, which can effectively avoid interference from the moving arc, further improving the sensing detection precision of the narrow gap groove width.

4) When a welding image is processed, the position of the capture window for the image of the groove edge area is adjusted in real time according to changes in positions of the arc and groove edge, thereby improving the environmental adaptability and working reliability of the sensing detection method.

5) The welding image is acquired in an external triggering manner according to an arc swing position signal, which can implement detecting the groove width multiple times within one swing period, thereby improving the timeliness of the groove width sensing detection and the arc swing angle control.

BRIEF DESCRIPTION OF THE DRAWINGS

The present invention is further described in detail below with reference to the accompanying drawings and specific implementations. However, the protection scope of the present invention is not limited to the following embodiments, and all technical solutions obtained by using equivalent replacements or equivalent transformations fall within the protection scope of the present invention.

FIG. 4(a) is a diagram of the principle of extracting a right edge position of the groove when an arc is deviated towards the left side wall of the groove, and FIG. 4(b) is a diagram of the principle of extracting the left edge position of the groove when the arc is deviated towards the right side wall of the groove.

FIG. 5(a) is a diagram of the principle of extracting a previous groove width when an arc is deviated towards the left side wall of the groove, and FIG. 5(b) is a diagram of the principle of extracting the current groove width when the arc is deviated towards the right side wall of the groove.

FIG. 8 is an embodiment diagram of method 1 of extracting the narrow gap groove width.

In FIG. 1: 1 represents an arc; 2 represents a straight contact tip; 3 represents a bent conducting rod; 4 represents a motor drive and feed mechanism; 5 represents a welding wire; 6 represents a wire feeder; 7 represents a workpiece; 8 represents a circular arc swing trajectory of an arc; 9 represents a to-be-welded groove; 10 represents an arc swing parameter control system; 11 represents a computer image processing system; 12 represents an infrared camera; 13 represents an infrared filter system; 14 represents an image acquisition card; 15 represents a groove width extraction module; 16 represents a swing angle calculation module; $V_w$ represents a welding speed; $P_M$ represents a motor rotation position detection signal; $P_A$ represents an arc photographing and image acquisition triggering signal.

In FIG. 2: $A_0B_0$ represents an actual width of a narrow gap groove at the starting of the arc; $\alpha_0$ represents an initial swing angle of the arc at the actual groove width $A_0B_0$; circular arc $M_0O_{10}D_0$ represents an arc swing trajectory at the actual groove width $A_0B_0$ with respect to the welding torch; $O_2O_{1i}$ represents a central line of the groove 9; $O_{10}$ represents a midpoint of arc swing trajectory at the actual groove width $A_0B_0$; $O_{40}$ represents a projection, at the actual groove width $A_0B_0$, of the center of the welding torch on the bottom surface of the groove 9; $A_0M_0=D_0B_0=A_iM_i=D_iB_i=g$, representing a distance, at the actual groove width $A_0B_0$ or $A_iB_i$, from the axis of the arc $O_3M_j$ (j=0 or i, referring to FIG. 3) to a side wall of the groove in a direction perpendicular to the welding speed $V_w$, that is, a preserved process gap; $O_{40}M_0=O_{40}D_0=O_{4i}M_i=O_{4i}D_i=r$, which is an arc swing radius; $A_iB_i$ represents an actual width of the narrow gap groove at any position; $\alpha_i$ represents an arc swing angle target value at the actual groove width $A_iB_i$; circular arc $M_iO_{1i}D_i$ represents an arc swing trajectory at the actual groove width $A_iB_i$ with respect to the welding torch; $O_{1i}$ represents a midpoint of arc swing trajectory at the actual groove width $A_iB_i$; $O_{4i}$ represents a projection, at the actual groove width $A_iB_i$, of the midpoint of the welding torch on the bottom surface of the groove 9.

In FIG. 3: β represents a bending angle of the bent conducting rod 3; h represents the welding torch standoff height, that is, the height from the contact tip 2 to the workpiece; j represents a position ordinal number (j=0, . . . ) of the arc in the groove; $O_4O_{1j}$ represents a center line of the groove 9; $O_{1j}$ represents a midpoint of an arc swing trajectory at an actual groove width $A_jB_j$; $O_{4j}$ represents a projection, at the actual groove width $A_jB_j$, of the center of the welding torch on the bottom surface of the groove 9; $A_jM_j=D_jB_j=g$, representing a distance, at the actual groove width $A_jB_j$, from the axis of the arc $O_3M_j$ to a side wall of the groove in a direction perpendicular to the welding speed $V_w$, that is, a preserved process gap; $O_{4j}M_j=O_{4j}D_j=r$, which is an arc swing radius.

In FIG. 4 and FIG. 5: 17 represents a right image capture window; 18 represents a left image capture window; 19 represents a right edge of the groove; 20 represents a left edge of the groove; 21 represents a rear edge of a welding pool; 22 represents a front edge of the welding pool; $L_{1i}$ represents a current distance from the right edge 19 of the groove to a left boundary of a global image; $L_{2i}$ represents a current distance from the left edge 20 of the groove to the left boundary of the global image; $G_i$ represents a current detection value of the groove width; $D_{w1}$ represents a positioning point of the right image capture window 17; $D_{w2}$ represents a positioning point of the left image capture window 18; $C_1$ represents the highest point of an arc area in previous detection; $C_2$ represents the highest point of the arc area in current detection; $L_{1(i-1)}$ represents a previous distance from the right edge 19 of the groove to the left boundary of the global image; $L_{2(i-1)}$ represents a previous distance from the left edge 20 of the groove to the left boundary of the global image; represents a previous detection value of the groove width.

DETAILED DESCRIPTION

Figure 1:
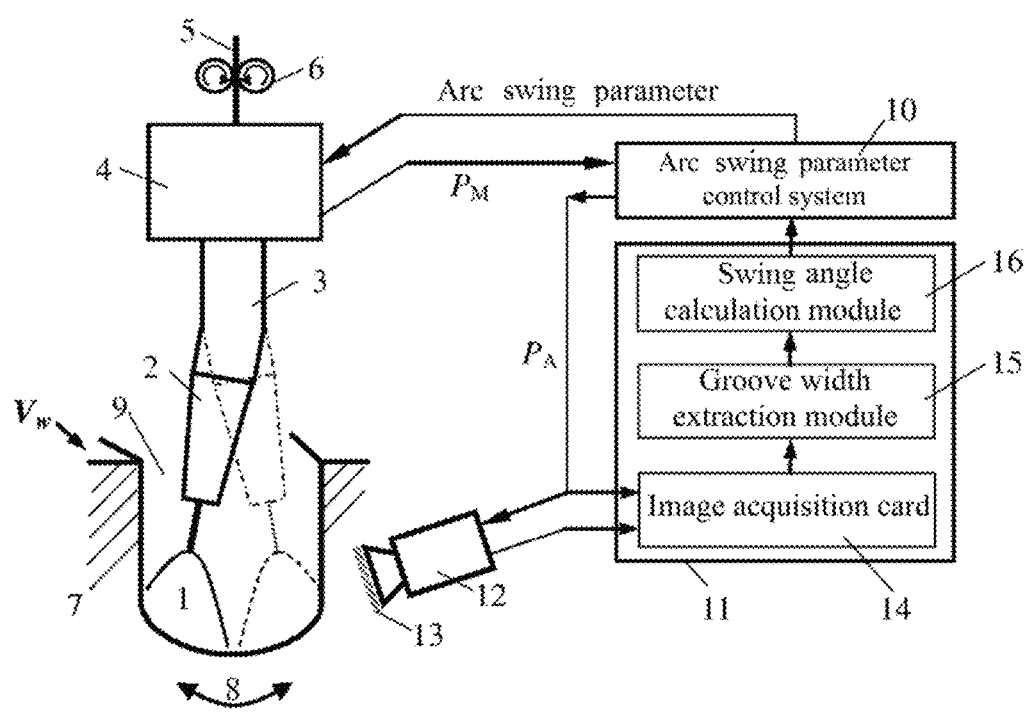
FIG. 1 is a block diagram of a principle of an adaptive control system for narrow gap welding arc swing.

As shown in FIG. 1, an adaptive control system for narrow gap welding arc swing includes: a narrow gap welding torch, an arc swing parameter control system 10, a computer image processing system 11, and an infrared camera system.

The narrow gap welding torch is composed of a motor drive and feed mechanism 4, a bent conducting rod 3, a straight contact tip 2, a nozzle mechanism, and the like. The motor drive and feed mechanism 4 may be directly driven by a hollow axis motor, or may be indirectly driven by an ordinary motor through a transmission pair, and is preferably directly driven by a hollow shaft motor. A welding wire 5 after alignment passes through a wire feeder 6, is output after sequentially passing through the motor drive and feed mechanism 4, the bent conducting rod 3, and a central hole of the straight contact tip 2, and extends into a to-be-welded groove 9 to generate a welding arc 1. The to-be-welded groove 9 is a narrow gap welding groove with a variable groove width. A brush in the motor drive and feed mechanism 4 leads a welding current into a loop of the welding arc 1, realizing welding feed without winding of a welding cable. A gas supply system provides, through the nozzle mechanism in the welding torch, active or inert shield gases to a welding area where the arc 1 is located. However, when welding is performed by using a self-shielded flux-cored wire, the nozzle mechanism is not needed, and it is unnecessary to provide shield gases to the welding area. Such a bent conducting rod swing mechanism achieves better arc directivity, and also simplifies the design of the welding torch mechanism.

The infrared camera system includes a digital infrared camera 12 and an infrared filter system 13. The infrared filter system 13 is coaxially connected to the infrared camera 12, and is mounted right ahead of the infrared camera 12. The infrared camera 12 may be of a charge-coupled device (CCD) type or a complementary metal oxide semiconductor (CMOS) type, and is preferably of a CMOS type. The infrared camera 12 is fixedly connected right ahead of or right behind the welding torch, forming a certain angle γ between the infrared camera 12 and the bottom surface of the to-be-welded groove 9, so that the infrared camera 12 conveniently acquires an image of a welding area in the to-be-welded groove 9. An infrared camera 12 with a zoom range of 18 mm to 45 mm and an aperture of 5.6 to 32 is selected, to acquire the image of the welding area in an external triggering manner. The filter system 13 includes a narrow bandpass filter, a neutral dimmer glass, and protection glass (namely, a UV filter), where a central wavelength of the narrow bandpass filter is 700 nm to 1100 nm, the transmittance of the neutral dimmer glass is 1% to 50%, and the UV filter is used for protection from weld spatter. During narrow gap welding, the arc light of the arc 1 and radiation light of a welding pool are used as a light source, light intensity is adjusted by using the neutral dimmer glass, and interference from arc light, welding fume, and spatter is removed by filtration by the filter system 13, so that a clear image of the welding area can be acquired.

The computer image processing system 11 mainly includes an image acquisition card 14, a groove width extraction module 15, and a swing angle calculation module 16 that are sequentially connected, and is further equipped with hardware devices that are necessary for an ordinary computer, such as a display and a memory. The image acquisition card 14 is disposed in a card slot of the computer image processing system 11 and is connected to the infrared camera 12 through a video line. An image of a welding area acquired by the infrared camera 12 is input, through the image acquisition card 14, to the computer image processing system 11 for processing, and at the same time, is displayed on the display of the computer image processing system 11, to facilitate monitoring. An output of the swing angle calculation module 16 is connected to the arc swing parameter control system 10; the arc swing parameter control system 10 is connected to the welding torch through a control line, and output arc swing parameters to the welding torch, to control the rotation of the motor drive and feed mechanism 4. The arc swing parameter control system 10 is further separately connected to the infrared camera 12 and the image acquisition card 14 through a signal line.

Figure 2:
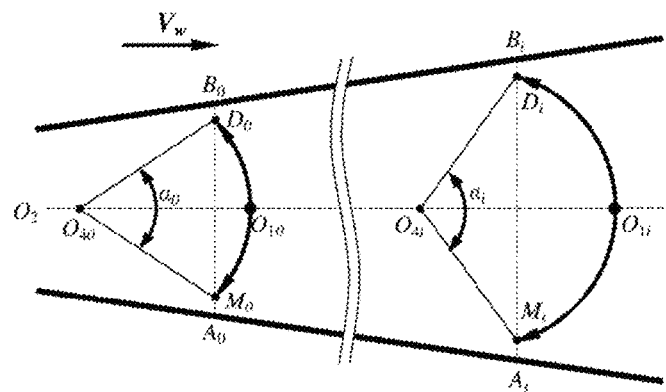
FIG. 2 is a schematic diagram of a process of adaptive control for narrow gap welding arc swing.
Figure 3:
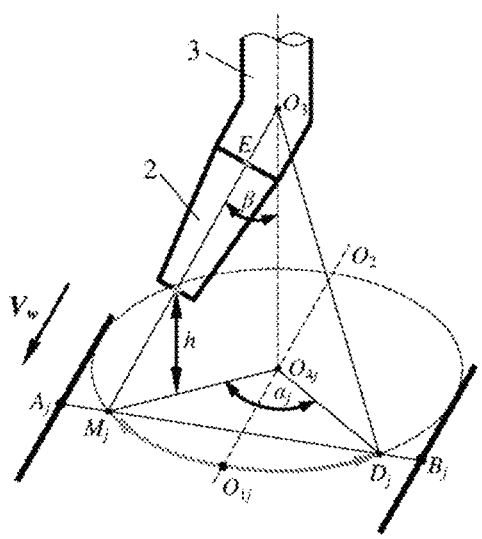
FIG. 3 is a principle diagram of calculation of an arc swing radius and an arc swing angle.

A general technical solution of an adaptive control method for narrow gap welding arc swing according to the present invention is: the infrared camera system acquires an image of a welding area in an arc position external triggering manner, and senses the welding groove width in real time; then, the computer image processing system 11 calculates an arc swing angle target value after extracting a value of the groove width through image processing; finally, the arc swing parameter control system 10 controls the motor drive and feed mechanism 4 to directly drive the bent conducting rod 3, and drives the arc 1 at an end portion of the welding wire 5 output from the straight contact tip 2 to conduct, in the to-be-welded groove 9, swing along a circular arc trajectory 8 with respect to the welding torch according to the target swing angle, realizing adaptive control of the arc swing angle according to changes in the width of the groove. Specific steps of the method are as follows:

Step ①, referring to FIG. 1, FIG. 2, and FIG. 3, further specifically includes:

1) Select an arc swing radius r, or match a straight contact tip 2 having a length of b. According to the bent conducting rod 3 and straight contact tip 2 mounted on the welding torch as well as the set welding torch standoff height h, the swing radius r of the arc 1 in a narrow gap welding process can be calculated according to the following formula (1), and a calculation principle is as shown in FIG. 3 ($r=O_{4j}M_j=O_{4j}D_j$), and at $A_0B_0$, j=0):

$$r=(a+b)\sin \beta + h \tan \beta \quad (1)$$

where a represents the length of the bending part $O_3E$ of the bent conducting rod 3, b represents the length of the straight contact tip 2, h represents the welding torch standoff height of the welding torch, β represents a bending angle of the bent conducting rod 3. A calculation result of the arc swing radius r should meet the condition: $r \geq (G_{max}-2g)/2$, and herein, $G_{max}$ represents a possible maximum value of the groove width, and g represents a preserved process gap.

Alternatively, the arc swing radius r may be selected according to the principle of $r \geq (G_{max}-2g)/2$ first, and then, the straight contact tip 2 having a corresponding length of b is matched according to the given bending length a and bending angle β of the bent conducting rod 3 as well as the welding torch standoff height h and in accordance with the formula (1). In the narrow gap welding process, the bent conducting rod 3, the straight contact tip 2, and the welding torch standoff height h are generally unchanged, and therefore, the swing radius r of the arc 1 remains constant.

2) Determine a groove width initial value $G_{s0}$ and a preserved process gap g. Before welding, an initial value $G_{s0}$ of the groove width at the starting of the arc of the narrow gap to-be-welded groove 9, that is, the length of the line segment $A_0B_0$ (referring to FIG. 2) is measured, and is regarded as a sampling value at the actual groove width $A_0B_0$; moreover, to obtain sufficient penetration having good symmetry on two side walls of the groove, it is necessary to select a suitable preserved process gap g: at $A_0B_0$, a projection of the circular arc swing trajectory 8 of arc with respect to the welding torch intersects with the line segment $A_0B_0$ at two points: $M_0$ and $D_0$ (point $M_0$ is close to point $A_0$ on the left, and point $D_0$ is close to point $B_0$ on the right), and the length of the line segments $A_0M_0$ and $D_0B_0$ is the preserved process gap g, that is, $g=A_0M_0=D_0B_0$; the preserved process gap g is the shortest distance from the axis of the arc to the left and right side walls of the groove in a direction perpendicular to a welding speed $V_w$, and the value of the preserved process gap g is generally 0.5 mm to 2 mm.

3) Preset an arc swing control parameter and a process parameter, and adjust an initial state of the welding torch. The initial value $G_{s0}$ of the groove width, and the preserved process gap g required by the narrow gap welding process, the calculated or selected arc swing radius r, and a groove width change determination threshold $TH_w$ (which is generally less than 0.5 mm) are together preset in the swing angle calculation module 16 of the computer image processing system 11; then, the welding torch and the infrared camera 12 are together moved to the starting of the arc where the actual groove width is $A_0B_0$, and the welding torch standoff height h of the is set. In this case, a projection of the welding torch at the bottom surface of the to-be-welded groove 9 is $O_{40}$; on the arc swing parameter control system 10, swing process parameters, such as an arc swing frequency f and stay duration $t_s$ of the arc 1 on the two side walls of the groove, required by the current narrow gap welding are preset, and the position of a swing midpoint $O_{10}$ is automatically searched for (referring to FIG. 2).

4) Determine an initial swing angle $\alpha_0$ of the arc. According to the foregoing preserved process gap g, initial value $G_{s0}$ of the groove width, and the arc swing radius r, the swing angle calculation module 16 calculates the initial swing angle $\alpha_0$ at the position where the actual groove width is $A_0B_0$ by using the following formula (3), and outputs the calculated initial swing angle $\alpha_0$ to the arc swing parameter control system 10. According to FIG. 3, an arc swing angle $\alpha_j$ at a position where an actual groove width is $A_jB_j$ is as follows:

$$\alpha_j = 2 \arcsin\{(\overline{A_jB_j} - 2g)/2r\} \quad (2)$$

Therefore, the initial swing angle α0 at the position where the actual width is $A_0B_0$ is:

$$\alpha_0 = \alpha_j \mid_{j=0} = 2\arcsin\{(\overline{A_0B_0} - 2g)/2r\} \quad (3)$$
$$= 2\arcsin\{(G_{s0} - 2g)/2r\}$$

5) Start a swing arc welding process. At the position where the actual groove width is $A_0B_0$, the welding arc 1 is ignited, and the arc swing parameter control system 10 controls the motor drive and feed mechanism 4 to rotate the bent conducting rod 3, which can extend into the to-be-welded groove 9, to rotate in a reciprocating manner around a center line $O_3O_{4j}$ (referring to FIG. 3, at $A_0B_0$, j=0) of the welding torch, driving the welding arc 1 at the end portion of the welding wire 5 output from a central hole of the straight contact tip 2 to conduct, in the to-be-welded groove 9, reciprocating swing along the circular arc trajectory 8 with respect to the welding torch and symmetric about a midpoint $O_{10}$ of the swing trajectory, where the midpoint $O_{10}$ of the swing trajectory is used as a start point, a swing frequency is f, and a swing angle is $\alpha_0$ (referring to FIG. 2); besides, the welding arc 1 stays at positions (that is, points $M_0$ and $D_0$) close to the left and right side walls of the to-be-welded groove 9, where the stay duration is $t_s$; meanwhile, a pulling mechanism drives the whole welding torch to move forward together with the infrared camera system at the welding speed $V_w$.

Step ②: During movement of the welding torch, a photoelectric (or electromagnetic) detection device in the motor drive and feed mechanism 4 detects a motor rotation position in real time, and inputs a generated motor rotation position detection signal $P_M$ to the arc swing parameter control system 10, thereby indirectly detecting a position of the arc 1 relative to the groove center line $O_2O_{1i}$ in the to-be-welded groove 9.

Then, the arc swing parameter control system 10 simultaneously outputs an arc photographing and image acquisition triggering signal $P_A$ to an external triggering signal input end of the infrared camera 12 and the welding image acquisition card 14 according to the input motor rotation position detection signal $P_M$ when the arc 1 is deviated towards the left or the right side wall of the to-be-welded groove 9 (or is located at the center of the groove), so that the computer image processing system 11 can acquire a welding area image of any moment. Each time the arc swing parameter control system 10 outputs an arc photographing and image acquisition pulse signal $P_A$, the computer image processing system 11 acquires one frame of welding area image, and the image is immediately input to the width extraction module 15, so that the groove width is extracted in real time after image processing (for details of the specific real-time groove width extraction method, refer to the following description).

Step ③: When the welding torch moves from the starting of the arc at the groove width $A_0B_0$ to any position where the actual groove width is $A_iB_i$ (referring to FIG. 2), correspondingly, the projection of the center of the welding torch moves from original $O_{40}$ to point $O_{4i}$, and the projection of the circular arc swing trajectory 8 of the arc intersects with the line segment $A_iB_i$ at two points: $M_i$ and $D_i$.

At the same time, the groove width extraction module 15 processes a welding area image at the actual groove width AiBi (an actual sampling point ordinal number i≥1), extracts in real time a current detection value $G_i$ of the groove width at $A_iB_i$, then calculates a median or mean of a total of n (n≥1) or (when i<n) detection values of the groove width according to the current detection value $G_i$ and latest (n−1) (when i≥n) or (i−1) (when i<n) detection values of the groove width that are previously obtained at other positions, and uses the median or mean as a current sampling value $G_{si}$ of the groove width at $A_iB_i$, so as to reduce influence of weld spatter and other random interference on the detection precision of the groove width; finally, the groove width extraction module 15 inputs the current sampling value $G_{si}$ of the groove width at $A_iB_i$ to the swing angle calculation module 16.

Step ④: The swing angle calculation module 16 compares the current sampling value $G_{si}$ of the groove width at $A_iB_i$ with a previous sampling value $G_{s(i-1)}$ at another position, and if an absolute value $\Delta G_{si}$ of the difference between the two sampling values is not greater than the groove width change determination threshold $TH_w$, that is, $\Delta G_{si}|\Delta G_{si}-G_{si(i-1)}|\leq TH_w$, the arc swing angle $\alpha_i$ at the position where the actual groove width is $A_iB_i$ is not adjusted; otherwise, the swing angle calculation module 16 calculates the arc swing angle target value $\alpha_i$ at $A_iB_i$ according to the current sampling value $G_{si}$ of the groove width, the preserved process gap g, and the arc swing radius r, and in accordance with formula (4) evolved from formula (2), and outputs the arc swing angle target value $\alpha_i$ to the arc swing parameter control system 10.

$$\alpha_1 = \alpha_j |_{j=i} = 2\arcsin\{(\overline{A_iB_j} - 2g)/2r\} \quad (4)$$
$$= 2\arcsin\{(G_{si} - 2g)/2r\}$$

At this point, the arc swing parameter control system 10 controls in real time the motor drive and feed mechanism 4 to drive the bent conducting rod 3, and drives the welding arc 1 at the end portion of the welding wire 5 to conduct circular arc swing with an angle of $\alpha_1$, so that at the stay points $D_i$ and $M_i$ on the side walls, distances from the arc 1 to the side walls of the groove are separately equal to the set preserved process gap g, thus realizing adaptive adjustment and control of the narrow gap welding arc swing, thereby forming uniform penetration on two side walls of the to-be-welded groove 9. Step ② to Step ④ are repeated, till the welding process is finished. In Step ④, when the actual sampling point ordinal number i=1, that is, when the arc reaches the position where the actual groove width is $A_1B_1$, the previous sampling value $G_{s0}$ of the groove width is actually the initial value of the groove width at the position where the actual groove width is $A_0B_0$.

In the case where the groove is variable, if adaptive control is not performed on the arc swing angle target value $\alpha_i$, when the arc 1 swings to and stays at the point $D_i$ or $M_i$ on the side wall of the groove, a distance from the axis of the arc 1 to the side wall of the groove 9, that is, $A_iM_i$ or $D_iB_i$, constantly changes; when the distance is excessively large, the penetration on the side wall of the groove 9 may decrease, and when the penetration is excessively small, an undercut defect and/or side wall arc phenomenon occurs easily, thus deteriorating the forming quality of the welding seam and reducing the performance of joint. The present invention employs an infrared camera method, which is non-contact, for detecting the width of the narrow gap groove; the detection point is synchronous with the arc position, the detection sensitivity is good, the detection precision is high, and the resistance against the arc light, spatter, and smoke dust is strong; control precision of the arc swing angle can be improved, thereby realizing precise control for penetration on two side walls of the groove 9. If the present invention is used in coordination with a welding seam tracking and welding melting-cladding quantity control system, groove penetration of variable-groove narrow gap welding and welding melting-cladding quantity can be controlled at the same time, thereby obtaining a high-quality narrow gap welding joint with uniform penetration on groove side walls and consistent welding seam height.

Figure 4:
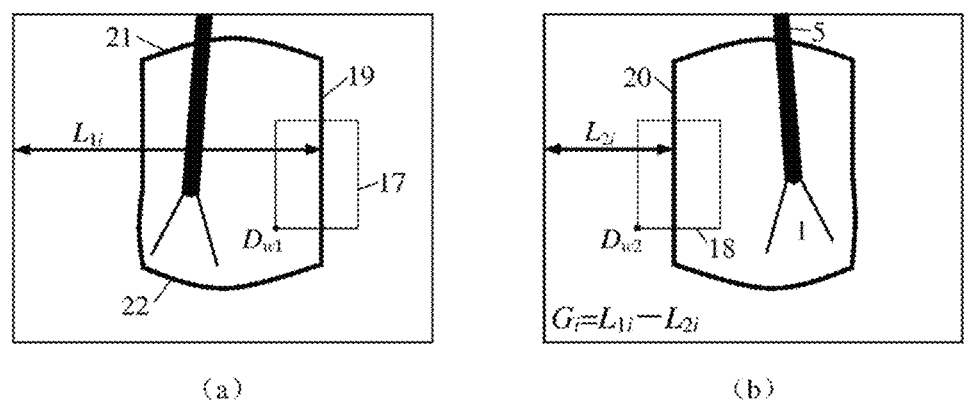
FIG. 4 is a schematic diagram of the principle of method 1 of extracting the width of a groove, where

When the groove width extraction module 15 extracts the width of the groove in real time, there are two groove width extraction methods, where a principle diagram of method 1 of extracting the width of the groove is shown in FIG. 4, which specifically includes the following steps:

A) When the arc 1 is deviated towards the left side wall of the to-be-welded groove 9, as shown in FIG. 4(a), first, an horizontal ordinate value $X_{1i}$ of a positioning point $D_{w1}$ of a right image capture window 17 of the groove is adjusted adaptively according to a variation between latest two detection values of a horizontal position of the right edge line 19 of the groove; then, an image of the right side of the groove without interference from the arc is captured by using the right image capture window 17 of the groove; next, after the right edge line 19 of the groove is extracted from the image captured by the image capture window 17, a current distance $L_{1i}$ from the right edge line 19 of the groove to a left boundary of a global image is calculated.

B) When the arc 1 is deviated towards the right side wall of the to-be-welded groove 9, as shown in FIG. 4(b), first, an horizontal ordinate value $X_{2i}$ of a positioning point $D_{w2}$ of a left image capture window 18 of the groove is adjusted adaptively according to a variation between latest two detection values of a horizontal position of the left edge line 20 of the groove; then, an image of the left side of the groove without interference from the arc is captured by using the left image capture window 18 of the groove; next, after the left edge line 20 of the groove is extracted from the image captured by the left image capture window 18 of the groove, a current distance $L_{2i}$ from the left edge line 20 of the groove to the left boundary of the global image is calculated; in this case, the current detection value of the groove width is $G_i=(L_{1i}-L_{2i})$.

C) When the arc 1 is deviated towards the left side wall of the to-be-welded groove 9 again, after the right edge line 19 of the groove is extracted according to the method of Step A), a next distance $L_{1(i+1)}$ from the right edge line 19 of the groove to the left boundary of the global image is extracted; in this case, a next detection value of the width of the narrow gap groove is $G_{i+1}=(L_{1(i+1)}-L_{2i})$; the rest can be done in the same manner.

When the groove width extraction method 1 is implemented, the sequence of calculating the current distance $L_{1i}$ or $L_{2i}$ from the right edge line 19 of the groove or the left edge line 20 of the groove to the left boundary of the global image in Step A) and Step B) may be inverted (in this case, the groove edge extracted in Step C) also changes correspondingly), and preferably, Step A) and Step B) are jointly used with Step C).

When a groove width extraction method consisting of only Step A) and Step B) is employed, if welding images during stay of the arc on two side walls of the groove are acquired, two complete welding images can be obtained within one swing period, and correspondingly, the groove width value can be extracted only once; if welding images during arc movement are acquired, at least two pairs of (four) welding images can be obtained within one swing period, and correspondingly, the groove width can be extracted at least twice. When a preferred extraction solution jointly using Step A), Step B), and Step C) is employed, if welding images during stay of the arc on two side walls of the groove are acquired, two complete welding images can be obtained within one swing period, and correspondingly, the width of the narrow gap groove can be extracted twice (excluding initial extraction); if welding images during arc movement are acquired, although at least four welding images can be obtained, the four images are arranged in a manner of "arc deviated towards left-towards right-towards right-towards left" or "arc deviated towards right-towards left-towards left-towards right" rather than being connected end to end. Therefore, correspondingly, the width of the groove can be extracted only twice (excluding initial extraction). It can be seen that, when the width is extracted by employing the preferred solution or according to the welding images during arc movement, the sampling frequency of the groove width can be improved, thereby improving the timeliness of the groove width sensing detection and the arc swing angle control. In addition, the position-mobile image-capture small window 17 or 18 captures an image of a groove edge area away from the arc side for processing, so that interference from the moving arc can be effectively avoided, further improving the sensing detection precision of the narrow gap groove width.

Figure 5:
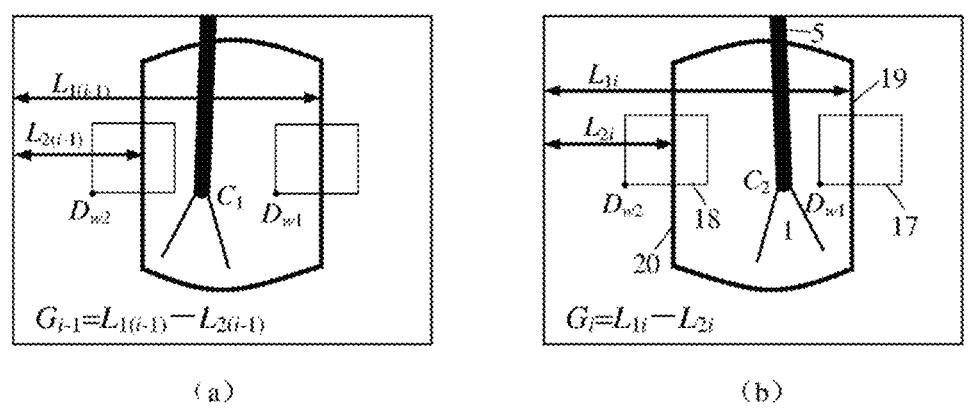
FIG. 5 is a schematic diagram of the principle of method 2 of extracting the width of a groove, where

A principle of the groove width extraction method 2 implemented in real time by the groove width extraction module 15 is shown in FIG. 5. In this case, the mobile right image capture window 17 of the groove and left image capture window 18 of the groove coexist, and the method specifically includes the following steps:

P) Process the global (i.e., whole) welding image, extract position coordinates of the highest point $C_1$ or $C_2$ of the arc area, and then determine, according to an ordinate value $Y_{C1}$ or $Y_{C2}$ of the highest point $C_1$ or $C_2$ of the arc area, that an ordinate value of a positioning point $D_{w1}$ or $D_{w2}$ of the image capture window 17 or 18 is $Y_{C1}$ or $Y_{C2}$; meanwhile, adaptively adjust an horizontal ordinate value $X_{1i}$ or $X_{2i}$ of the positioning point $D_{w1}$ or $D_{w2}$ of the right image capture window 17 or left image capture window 18 of the groove according to changes in detection values of the horizontal position of the edge line 19 or 20 of the groove.

Q) Capture, by using the right image capture window 17, an image including information about the right edge 19 of the groove, and then calculate a current distance $L_{1i}$ from the right edge 19 of the groove to the left boundary of the global image.

R) In the same welding image, capture, by using the left image capture window 18, an image including information about the left edge line 20 of the groove, and then calculate a current distance $L_{2i}$ from the left edge line 20 of the groove to the left boundary of the global image, where in this case, a current detection value of the groove width is: $G_i=(L_{1i}-L_{2i})$.

When the groove width is extracted by using the groove width extraction method 2, the sequence of calculating the current distance $L_{1i}$ or $L_{2i}$ from the edge line 19 or 20 of the groove to the left boundary of the global image in Step Q) and Step R) may be inverted; preferably, the information about the groove width is extracted according to a welding image when the arc moves to the swing midpoint $O_{1i}$, and in this case, Step P) may be omitted. Similarly, in the previous extraction in FIG. 5(a), the previous detection value $G_{i-1}$ of the groove width is equal to a result of subtracting a previous distance $L_{2(i-1)}$ from the left edge line 20 of the groove to the left boundary of the global image from a previous distance $L_{i(i-1)}$ from the right edge line 19 of the groove to the left boundary of the global image, that is, $G_{i-1}=(L_{1(i-1)}-L_{2(i-1)})$.

By using the groove width extraction method 2, the groove width can be extracted multiple times within one swing period. For the preferred solution, the arc passes through the swing midpoint $O_{1i}$ twice during swing within one swing period, and correspondingly, the groove width can be extracted twice. Moreover, in the groove width extraction method 2, a detection point of the distance $L_{2i}$ or $L_{1i}$ from the left edge 20 or right edge 19 of the groove to the left boundary of the global image is preferably at a half-height position or higher position in the left image capture window 18 or right image capture window 17, so as to reduce interference from arc light as much as possible.

In the narrow gap groove width extraction method 1 and extraction method 2, an ordinate value of a detection point of the distance $L_{2i}$ or $L_{2(i-1)}$ from the left edge line 20 of the groove to the left boundary of the global image is the same as an ordinate value of a detection point of the distance $L_{1i}$ or $L_{1(i-1)}$ from the right edge line 19 of the groove to the left boundary of the global image; moreover, a final detection value of $L_{1i}$, $L_{2i}$, or $L_{1(i-1)}$ may be a median or mean of detection values at m (m≥1) positions on the edge line 19 or 20 of the groove in the image-capture small window 17 or 18, so as to improve the detection reliability of the groove width.

Figure 6:
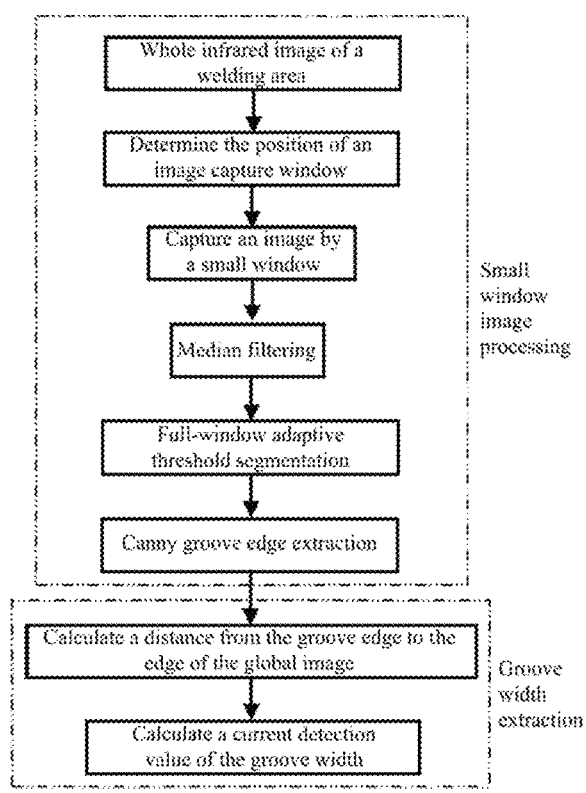
FIG. 6 is a flowchart of width extraction when method 1 of extracting the groove width is used.

Image processing is the key to function implementation of the groove width extraction module 15. FIG. 6 shows a process of extracting the groove width by using an image processing technology in the groove width extraction method 1, which mainly includes the following two steps:

1) Process the image captured by the small window, to extract the edge of the narrow gap groove. Specifically, this step further includes: ① adaptively correcting the horizontal ordinate value $X_{1i}$ or $X_{2i}$ of the positioning point $D_{w1}$ or $D_{w2}$ of the mobile image capture window 17 or 18 according to changes in the horizontal coordinate position of the edge line 19 or 20 of the groove, to determine the position of the image capture window; ② for the real-time welding image acquired by the digital infrared camera 12, capturing an image of an area near the right side wall edge 19 or left side wall edge 20 of the groove by using the mobile image capture window 17 or 18, and preferentially capturing an image of a groove edge area away from the arc side; ③ performing, by using a median method, smooth filtering on the image captured by the mobile small window 17 or 18; ④ performing adaptive threshold segmentation on a full-window image by using an Otsu method (translated by Ruan Qiuqi, et al., "Digital Image Processing (Third Edition)", Electronic Industry Press, 2011, page 479); ⑤ extracting the edge line 19 or 20 between the welding pool and the side wall of the groove by using a Canny edge operator (translated by Li Shiying, et al., "Feature Extraction and Image Processing (Second Edition)", Electronic Industry Press, 2013, page 103).

2) Extract a current detection value of the groove width. It is calculated that the current distance from the right edge 19 or the left edge 20 of the groove to the left boundary of the global image is $L_{1i}$ or $L_{2i}$, thereby calculating the current detection value of the groove width: $G_i=(L_{1i}-L_{2i})$.

Figure 7:
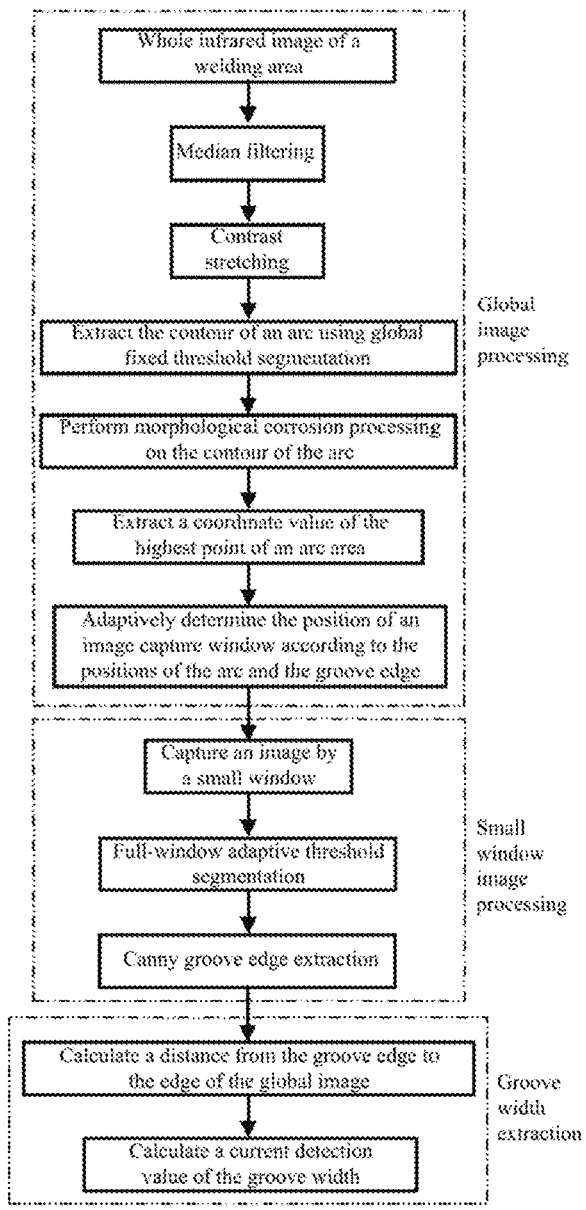
FIG. 7 is a flowchart of width extraction when method 2 of extracting the groove width is used.

FIG. 7 shows a process of extracting the width of the groove by using an image processing technology in the groove width extraction method 2, which mainly includes the following three steps:

1) Perform global image processing on the whole infrared image of the welding area, and determine the position of the image-capture small window. Specifically, this step further includes: ① for the real-time welding image acquired by the digital infrared camera 12, performing smooth filtering on the global image (that is, the whole image) by using a median method, to reduce noise in the welding image caused by arc light, spatter, smoke dust, and interference from an external environment; ② based on the gray-scale value analysis on the image, performing piecewise linear transformation on the gray-scale of the input image, to compress the gray-scale of a background area, improve pixel gray-scale values of the welding pool and arc area, and increase the contract at the boundary, to implement contrast stretching processing on the image, thus creating conditions for subsequent threshold segmentation; ③ performing fixed threshold segmentation on the global image, that is, converting an image including different gray scales into a binary image, to simplify image layers and highlight the contour of the arc area; ④ performing morphological corrosion processing on the contour of the arc, to eliminate the influence from the reflective area at the end portion of the welding wire, extracting a basic form of the arc, and calculating that a position coordinate value of the highest point $C_1$ or $C_2$ of the arc area is $(X_{C1}, Y_{C1})$ or $(X_{C2}, Y_{C2})$; ⑤ determining the ordinate value of the positioning point $D_{w1}$ or $D_{w2}$ of the mobile image-capture small window 17 or 18 according to the ordinate value of the highest point $C_1$ or $C_2$ of the arc area, and meanwhile, adaptively correcting the horizontal ordinate value $X_{1i}$ or $X_{2i}$ of the positioning point $D_{w1}$ or $D_{w2}$ of the mobile image capture window 17 or 18 according to changes in the horizontal ordinate position of the edge line of the groove, so as to improve the environmental adaptability and working reliability of the infrared visual sensing detection method.

2) Process the image captured by the mobile small window, to extract the edge of the narrow gap groove. Specifically, this step further includes: ① recognizing and determining, by using the arc photographing and image acquisition triggering signal $P_A$ input to the computer image processing system 11 or according to the horizontal ordinate value $X_{C1}$ or $X_{C2}$ of the highest point $C_1$ or $C_2$ of the arc area, whether the arc is deviated towards the left or the right side wall of groove, or is at the center of the groove; ② for the welding image after the processing of global median filtering and contrast stretching, an image of an area near the right side wall edge 19 or left side wall edge 20 of the groove is captured by using the mobile image-capture small window 17 or 18, and preferentially capturing an image of a groove edge area away from the arc side, so as to reduce the image processing workload of the computer image processing system 11, and meanwhile avoid interference from the moving arc; ③ after performing a gray-scale analysis on the captured full window image, to automatically search for peak and valley points of gray-scale distributions of the welding pool image and the background image and position a threshold point, performing adaptive threshold segmentation on the full-window image by using an Otsu method, that is, performing binary processing on the image to highlight the boundary, thereby facilitating edge extraction; ④ after noise is removed by performing, with a Canny edge operator, smoothing and filtering processing on the window image on which the adaptive threshold segmentation processing has been performed, detecting positions where gray-scales of the welding pool and the background image change, and extracting, in the small window, the edge line 19 or 20 between the welding pool and the side wall of the groove.

3) Calculate a current detection value of the groove width. A current distance $L_{yi}$ from the right edge 19 of the groove to the left edge of the mobile image-capture small window 17 is calculated; it is calculated that a current distance from the right edge 19 of the groove to the left boundary of the global image is $L_{1i}=(L_{yi}+X_{1i})$; a current distance Lzi from the left edge 20 of the groove to the left edge of the mobile image-capture small window 18 is calculated; it is calculated that a current distance from the left edge 20 of the groove to the left boundary of the global image is $L_{2i}=(L_{zi}+X_{2i})$ thereby calculating the current detection value of the groove width: $G_i=(L_{1i}-L_{2i})$.

In the groove width extraction process shown in FIG. 6 and FIG. 7, an adaptive correction algorithm for the position of the mobile image-capture small window is:

1) Adaptive correction algorithm for the ordinate of the positioning point $D_{w1}$ or $D_{w2}$ of the mobile image capture window 17 or 18: in the groove width extraction method 2, determining, according to the ordinate $Y_{C1}$ or $Y_{C2}$ of the position of the highest point $C_1$ or $C_2$ of the arc area, that the ordinate of the positioning point $D_{w1}$ or $D_{w2}$ of the mobile image capture window 17 or 18 is $Y_{C1}$ or $Y_{C2}$. This correction algorithm may also be applied to the groove width extraction method 1.

2) Adaptive correction algorithm for the horizontal ordinate of the positioning point $D_{w1}$ or $D_{w2}$ of the mobile image capture window 17 or 18: in the groove width extraction method 1 and method 2, the horizontal ordinate value $X_{1i}$ of the positioning point $D_{w1}$ of the mobile image capture window 17 is equal to the sum of a previous set value $X_{1(i-1)}$ and a variation $(L_{1(i-1)}-L_{1(i-2)})$ between latest two detection values of the position of the right edge line 19 of the groove, that is, $X_{1i}=X_{1(i-1)}+(L_{1(i-1)}+L_{1(i-2)})$; the horizontal ordinate value $X_{2i}$ of the positioning point $D_{w2}$ of the mobile image capture window 18 is equal to the sum of a previous set value $X_{2(i-1)}$ and a variation $(L_{2(i-1)}-L_{2(i-2)})$ between latest two detection values of the position of the left edge line 20 of the groove, that is, $X_{2i}=X_{2(i-1)}+(L_{2(i-1)}-L_{2(i-2)})$.

The following provides four embodiments of the present invention.

Embodiment 1

FIG. 8 is an embodiment diagram of method 1 of detecting the width of a narrow gap groove. Photographing conditions are as follows: the digital infrared CMOS camera 12 has a camera angle of $\gamma=25°$ and an aperture of 16; the narrow bandpass filter has a central wavelength of 970 nm and a bandwidth of 25 nm; transmittance of the neutral dimmer glass is 10%. Welding conditions are as follows: flat-position direct-current MAG arc welding is employed, a welding current is 300 A, an arc voltage is 30 V, a welding speed is 20.3 cm/min, the welding torch standoff height: h=20 mm, a welding wire diameter is 1.2 mm, welding shield gases are Ar+20% of $CO_2$ at a rate of 30 L/min, a groove width of I-type narrow gap mild steel welding is 13 mm, and a welding seam centring state is maintained during welding. Arc swing process parameter conditions are as follows: a swing frequency f=2.5 Hz, a swing radius r=8.5 mm, a bending angle of the bent conducting rod 3: $\beta=8°$, a swing angle $\alpha_j=72°$, stay duration of the arc on each of two side walls of the groove: $t_s=100$ ms, and a preserved process gap g=1.5 mm.

FIGS. 8(a) and 8(b) are respectively welding images acquired by the computer image processing system 11 when the arc swings to the left side wall and right side wall of the groove and starts to stay. It can be seen that, when the arc stays on the left side and right side of the groove, distances from the welding wire to the left side wall and the right side wall of the groove are basically the same, indicating that a welding seam centering state is maintained. According to variations of latest two detection values of horizontal positions of the right edge line 19 and left edge line 20 of the groove, the horizontal ordinate values of the positioning points $D_{w1}$ and $D_{w2}$ of the right image-capture small window 17 and the left image-capture small window 18 of the groove are adaptively adjusted respectively, and the finally formed image-capture small windows are located at positions indicated by white-line blocks in FIGS. 8(a) and 8(b). After the welding image is captured by using the mobile small windows 17 and 18, and median filtering is performed, obtained small window images of groove edge areas are as shown in FIGS. 8(c) and 8(d). After full-window adaptive threshold segmentation processing is performed on the captured small window images by using an Otsu method, obtained images of groove edge areas are as shown in FIGS. 8(e) and 8(f), where the white area represents a welding pool area. Groove edge images extracted by using a Canny edge operator are shown by white lines in FIGS. 8(g) and 8(h).

Finally, according to the detection algorithm in the groove width detection method 1, and by using a median of detection values at three (that is, m=3) adjacent positions at intervals of 10 pixels on the groove edge line 19 or 20 in the mobile small window 17 or 18 as a current detection value of the groove width, it is calculated that the current detection value of the groove width $G_i$=13.13 mm, and a detection error rate is 1%.

Embodiment 2

Figure 9:
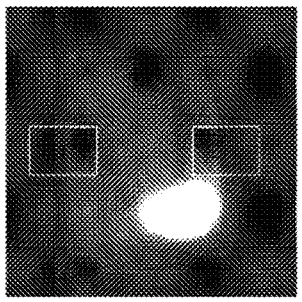
FIG. 9 is an embodiment diagram of method 2 of extracting the width of a narrow gap groove.

FIG. 9 is an embodiment diagram of method 2 of extracting the width of a narrow gap groove. Photographing conditions and swing arc welding test conditions are the same as those in Embodiment 1. FIG. 9(a) is a welding image acquired by the computer image processing system 11 when the arc swings to the right side wall of the groove and starts to stay. To make the expression intuitive, two white-line small windows are used herein to represent positions of the mobile small windows 17 and 18 adaptively determined according to the highest point $C_2$ of the arc area and changes in horizontal ordinate positions of the edge lines 19 and 20 of the groove. FIG. 9(b) is a morphological image of the arc after fixed threshold segmentation and morphological corrosion, position coordinates of the highest point $C_2$ of the arc are extracted accordingly, and ordinate positions of the mobile small windows 17 and 18 are determined (as shown in FIG. 9(a)). For a global image after median filtering and contrast stretching processing, at the positions indicated by white-line blocks in FIGS. 9(a) and 9(b), small window images of groove edge areas, as shown in FIGS. 9(c) and 9(d), are captured by using the mobile small windows 17 and 18 respectively. After full-window adaptive threshold segmentation processing is performed on the captured small window images by using an Otsu method, obtained images of groove edge areas are as shown in FIGS. 9(e) and 9(f), where the white area represents a welding pool area. Groove edge images extracted by using a Canny edge operator are shown by white lines in FIGS. 9(g) and 9(h).

Finally, according to the detection algorithm in the groove width detection method 2, and by using a median of detection values at three (that is, m=3) adjacent positions at intervals of 10 pixels on the groove edge line 19 or 20 in the mobile small window 17 or 18 as a current detection value of the groove width, it is calculated that the current detection value of the groove width $G_i$=13.27 mm, and a detection error rate is 2.08%. It can be seen that, for the same groove width actual value (13.0 mm), when detection is performed using the detection method 2, as the small window image in the mobile small window 17 is interfered by arc light, the error rate is higher than that of the detection method 1.

Embodiment 3

An embodiment of control for flat-position narrow gap welding arc swing is provided. With different arc swing radiuses, flat-position narrow gap welding arc swing control tests are conducted. Test conditions include: the preserved process gap g=2.0 mm, the swing frequency f=2.5 Hz, the stay duration on the side wall: $t_s$=100 ms, a bending angle of the bent conducting rod 3: β=8°, and the groove width change determination threshold $TH_w$=0.2 mm; as the groove gap changes continuously in a range of 8 mm to 16 mm, the welding speed $V_w$ correspondingly adjusts in a range of 30.4 cm/min to 15.2 cm/min automatically; other welding test conditions are the same as those in Embodiment 1.

In order to ensure the effectiveness of the arc swing control, when welding is performed using the minimum arc swing radius, at the maximum possible gap of the groove (that is, $G_{si}$=$G_{max}$), it should be ensured that in expression (4), arc swing angle $α_i$≤180°. Therefore, before welding, the minimum radius $r_{min}$ of arc swing is determined according to the following formula (5):

$$r_{min} = (G_{max} - 2g)/2 \qquad (5)$$

In the expression (5), $G_{max}$ is the maximum value that may occur during variation of the groove gap, and g is the preserved process gap. Correspondingly, in this embodiment, the minimum radius $r_{min}$ of arc swing is equal to 6 mm, that is, the arc swing radius r should not be less than 6 mm.

Therefore, before welding, it is selected that the arc swing radius r=6 mm; it is calculated, in accordance with formula (1), that the length b of the straight contact tip 2 is equal to 15.6 mm according to the known welding torch standoff height (h=20 mm), the bending angle (β=8°), and the bending length of the conducting rod 3: a=7.3 mm; moreover, the straight contact tip 2 with a corresponding length is matched. Then the camera 12 is fixedly connected to the prepared welding torch, and the welding torch is moved to the starting of the arc where the actual groove width is 8 mm; and the groove width initial value $G_{s0}$=8.0 mm and initial control parameters herein, such as the preserved process gap g=2.0 mm, the groove gap change determination threshold $TH_w$=0.2 mm, and the arc swing radius r=6 mm, are input to the swing angle calculation module 16. Next, on the arc swing parameter control system 10, it is set that the arc swing frequency f=2.5 Hz, and stay duration $t_s$ of the arc on each of two side walls of the groove is equal to 100 ms. In the swing angle calculation module 16, after the initial arc swing angle $α_0$=38.9° corresponding to the arc swing radius r is calculated according to formula (3), $α_0$ is input to the arc swing parameter control system 10, to complete presetting of three arc swing parameters, including the swing frequency f, the stay duration $t_s$ on side wall, and the initial arc swing angle $α_0$.

After the operation of automatically searching for an arc swing midpoint $O_{10}$ is performed on the welding torch, the arc 1 is ignited, and the arc swing parameter control system 10 controls the motor drive and feed mechanism 4 to rotate the bent conducting rod 3 that extends into the groove 9, and drives the welding arc 1 at the end portion of the welding wire 5 to conduct, in the groove 9, reciprocating swing along the circular arc trajectory 8 with respect to the welding torch, where the swing frequency f=2.5 Hz, and the swing is symmetric about the swing midpoint $O_{10}$ (or $O_{1i}$, referring to FIG. 2); and stay on each of the left and right side walls of the groove 9 by a stay duration $t_s$=100 ms. Meanwhile, the pulling mechanism drives the whole welding torch to move forward together with the infrared camera system at the welding speed $V_w$.

During welding, the welding area image is acquired in real time by using the infrared CMOS camera 12, and after the welding image is processed in the computer image processing system 11, the groove width extraction module 15 extracts the current detection value $G_i$ of the groove width by using a groove width extraction method similar to Embodiment 1, and uses mid-mean of latest 5 (that is, n=5) detection values of the groove width as the current sampling value $G_{si}$ of the groove width. If an absolute value of the variation $\Delta G_{si}$ between latest two sampling values of the groove width is not greater than an error control threshold $TH_W$=0.2 mm, that is $AG_{si}$=|$G_{si}$−$G_{s(i-1)}$|≤0.2 mm, the arc swing angle is not adjusted, where $G_{s(i-1)}$ is a previous sampling value of the groove width; otherwise, a current target value $\alpha_i$ of the arc swing angle is calculated according to the arc swing radius r and preserved process gap g that are set before welding as well as the current sampling value $G_{si}$ of the groove width, and in accordance with expression (4), and is input to the arc swing parameter control system 10. The motor drive and feed mechanism 4 drives the bent conducting rod 3, to control the arc 1 to conduct swing along the circular arc trajectory 8 with an angle of $\alpha_i$, so that at the stay point on the side wall of the groove, the distance from the arc to the side wall of the groove is equal to the set preserved process gap g, thereby ensuring that the arc can uniformly and effectively heat the side wall of the groove under a variable groove width, and obtaining stable penetration on groove side walls and consistent welding seam height.

In this embodiment, for the groove width that varies in the range of 8 mm to 16 mm, when the arc swing radius r=6 mm, a variation range during adjustment of the arc swing angle is 38.9° to 180.0°. In addition, under the same welding condition, in cases where r=7 mm, 8 mm, 9 mm, and 10 mm, adaptive control of arc swing is separately carried out by using a control method the same as that for the arc swing radius r=6 mm. The control results are: when the arc swing radius r=7 mm, a variation range during adjustment of the arc swing angle is 33.2° to 118.0°; when the arc swing radius r=8 mm, a variation range during adjustment of the arc swing angle is 29.0° to 97.2°; when the arc swing radius r=9 mm, a variation range during adjustment of the arc swing angle is 25.7° to 83.6°; when the arc swing radius r=10 mm, a variation range during adjustment of the arc swing angle is 23.1° to 73.7°.

Embodiment 4

An embodiment of control for vertical-position narrow gap welding arc swing is provided. With different arc swing radiuses, vertical-position narrow gap welding arc swing control tests are conducted. Test conditions include: pulse MAG arc welding is employed, an average welding current is 150 A, an average arc voltage is 22 V, a welding speed is 9.1 cm/min, the welding torch standoff height: h=20 mm, a welding wire diameter is 1.2 mm, welding shield gases are Ar+20% of $CO_2$ at a rate of 20 L/min, and a groove gap changes continuously in a range of 8 mm to 16 mm; the arc swing frequency f=0.8 Hz, the stay duration of the arc on each of two side walls of the groove: $t_s$=400 ms, and the preserved process gap g=1.0 mm; other test conditions are the same as those in Embodiment 1. In addition, before welding, it is calculated according to expression (5) that the minimum radius $r_{min}$ of arc swing is equal to 7 mm, that is, the arc swing radius r should not be less than 7 mm.

In this embodiment, a control method similar to the control for flat-position narrow gap welding arc swing involved in Embodiment 3 is employed. For a vertical groove width that varies in the range of 8 mm to 16 mm, when the arc swing radius r=7 mm, a variation range during adjustment of the arc swing angle is 50.8° to 180.0°; when the arc swing radius r=8 mm, a variation range during adjustment of the arc swing angle is 44.0° to 122.1°; when the arc swing radius r=9 mm, a variation range during adjustment of the arc swing angle is 38.9° to 102.1°; and when the arc swing radius r=10 mm, a variation range during adjustment of the arc swing angle is 34.9° to 88.9°.

It can be seen that, to be adaptive to an increase in the groove width, according to the algorithm proposed in expression (4), the arc swing angle is adjusted in real time from small to big, so that the two side walls of the narrow gap vertical-welding groove obtain uniform and stable penetration, thereby ensuring the quality of narrow gap vertical welding.

What is claimed is:

1. An adaptive control method adapted to an adaptive control device for narrow gap welding arc swing, the adaptive control device comprising a narrow gap welding torch, an arc swing parameter control system, a computer image processing system, and an infrared camera system; one end of a bent conducting rod in the narrow gap welding torch is connected to a motor drive and feed mechanism, and the other end is connected to a straight contact tip; a welding wire passing through the narrow gap welding torch extends into a to-be-welded groove with a variable groove width, to generate a welding arc; the infrared camera system comprises a digital infrared camera and an infrared filter system;

wherein:

the computer image processing system comprises an image acquisition card, a groove width extraction module, and a swing angle calculation module that are sequentially connected; an output of the swing angle calculation module is connected to the arc swing parameter control system; the arc swing parameter control system is connected to the motor drive and feed mechanism in the welding torch through a control line, and is separately connected to the infrared camera and the image acquisition card through a signal line;

wherein:

the infrared camera system acquires an infrared image of a welding area in an arc position external triggering manner, and extracts information about a width of a groove in real time after processing by the computer image processing system; the computer image processing system calculates an arc swing angle target value according to the width of the groove; the arc swing parameter control system controls the motor drive and feed mechanism to directly rotate the bent conducting rod, and then drives an arc to swing along a circular arc trajectory with respect to the welding torch according to a target swing angle, realizing adaptive control for the arc swing angle according to changes in the width of the groove;

wherein:

the adaptive control method specifically comprises the following steps:

① in the swing angle calculation module, after presetting an arc swing radius r, a preserved process gap g, a groove width change determination threshold $TH_w$, and a groove width initial value $G_{s0}$, calculating an initial swing angle $\alpha_0$ corresponding to the initial groove width $G_{s0}$, and using the groove width initial value $G_{s0}$ as a sampling value at a position where an actual groove width is $A_0B_0$; then moving forward the welding torch and the infrared camera system together, at a welding speed $V_w$, and at the same time, controlling, by the arc swing parameter control system through the welding torch, the arc to conduct, within the to-be-welded groove, reciprocating swing along the circular arc trajectory with a swing angle of $\alpha_0$;

②  sending, by the arc swing parameter control system, an arc photographing and image acquisition triggering signal $P_A$ to the infrared camera and the image acquisition card according to a motor rotation position detection signal $P_M$ when the arc is deviated towards a left or a right side wall of the to-be-welded groove or is located at the center of the groove, so that after the computer image processing system acquires the image of the welding area, the width extraction module extracts the width of the groove in real time by means of image processing;

③ when the welding torch moves to any position where an actual groove width is $A_iB_i$, extracting, by the groove width extraction module in real time, a current detection value $G_i$ of the groove width at this position, calculating a median or mean of a total of n (when n≥1) or i (when i<n) detection values of the groove width according to the current detection value and latest (n−1) (when i≥n) or (i−1) (when i<n) detection values of the groove width that are previously obtained at other positions, to use the median or mean as a current sampling value $G_{si}$ of the groove width at $A_iB_i$, and then inputting the current sampling value $G_{si}$ to the swing angle calculation module, wherein i is an actual sampling point ordinal number, and i≥1;

④ comparing, by the swing angle calculation module, the current sampling value $G_{si}$ of the groove width with a previous sampling value $G_{s(i-1)}$, wherein if an absolute value of the difference between the two sampling values is $\Delta G_{si} \leq TH_w$, the arc swing angle $\alpha_i$ at the position where the actual groove width is $A_iB_i$ is not adjusted; otherwise, after the swing angle calculation module calculates the arc swing angle target value $\alpha_i$ at $A_iB_i$ according to the current sampling value $G_{si}$ of the groove width, the preserved process gap g, and the arc swing radius r, driving, by the arc swing parameter control system, the bent conducting rod through the motor drive and feed mechanism, and controlling the arc to swing along the circular arc trajectory with an angle of $\alpha_i$, so that at side wall stay points $D_i$ and $M_i$, distances from the arc to the side walls of the groove are separately equal to the set preserved process gap g;

⑤ repeating Step ② to Step ④, till the welding process is finished.

2. The adaptive control method according to claim 1, wherein: in Step ②, method 1 of extracting the width of the groove in real time by the width extraction module is: when the arc is deviated towards the left side wall of the to-be-welded groove, adjusting an horizontal ordinate value of a positioning point of a right image capture window of the groove according to a horizontal position change of a right edge line of the groove, then capturing a right-side image of the groove, and extracting the right edge line of the groove and a current distance $L_{1i}$ from the right edge line of the groove to a left boundary of a global image; when the arc is deviated towards the right side wall of the to-be-welded groove, adjusting an horizontal ordinate value of a positioning point of a left image capture window of the groove according to a horizontal position change of a left edge line of the groove, then capturing a left-side image of the groove, extracting the left edge line of the groove and a current distance $L_{2i}$ from the left edge line of the groove to the left boundary of the global image, and calculating a current detection value of the groove width: $G_i = (L_{1i} - L_{2i})$.

3. The adaptive control method according to claim 1, wherein: in Step ②, a method 2 of extracting the width of the groove in real time by the width extraction module is: by processing a global welding image, extracting position coordinates of the highest point of an arc area, determining ordinate values of positioning points of left and right image capture windows of the groove according to an ordinate value of the highest point, and adjusting horizontal ordinate values of the positioning points of the image capture windows according to horizontal position changes of edge lines of the groove; after capturing, by using the right image capture window, an image comprising information about the right edge line of the groove, calculating a current distance $L_{1i}$ from the right edge line of the groove to a left boundary of the global image; in the same image, after capturing, by using the left image capture window of the groove, an image comprising information about the left edge line of the groove, calculating a current distance $L_2$ from the left edge line of the groove to the left boundary of the global image, and calculating a current detection value of the groove width: $G_i = (L_{1i} - L_{2i})$.

4. The adaptive control method according to claim 3, wherein: an ordinate value of a detection point of the distance $L_{2i}$ from the left edge line of the groove to the left boundary of the global image is the same as an ordinate value of a detection point of the distance $L_{1i}$ from the right edge line of the groove to the left boundary of the global image, and the ordinate value is a median or mean of detection values at m positions on the left and right edge lines of the groove in the left and right image capture windows of the groove, wherein m≥1.

5. The adaptive control method according to claim 3, wherein: when a small window image captured by the image capture window is processed, median filtering is performed first; then a gray-scale analysis is performed on the global image, to automatically search for peak and valley points of gray-scale distributions of a welding pool image and a background image and determine a threshold point; adaptive threshold segmentation processing is performed on the full window image using an Otsu method, and finally, the edge lines of the groove are extracted by using a Canny edge detection operator; when the global welding image is processed, median filtering and contrast stretching processing are employed first; next, the contour of the arc area is extracted after global fixed threshold segmentation is performed on the welding image; then, after morphological corrosion processing is performed on the contour of the arc area, position coordinates of the highest point of the arc area are extracted.

6. The adaptive control method according to claim 3, wherein: it is recognized and determined, according to the arc photographing and image acquisition triggering signal $P_A$ or an horizontal ordinate value of the highest point of the arc area, whether the arc is deviated towards the left or the right side wall of groove, or is at the center of the groove.

7. The adaptive control method according to claim 1, wherein: in Step ①, the preserved process gap g is the shortest distance, in a direction perpendicular to the welding speed $V_w$, from the axis of the arc to the left and right side walls of the groove; the preset arc swing radius r≥($G_{max}$−2g)/2, wherein r=(a+b) sin β+h tan β, $G_{max}$ is a possible maximum value of the groove width, a is the length of a bent part of the bent conducting rod of the welding torch, b is the length of the straight contact tip of the welding torch, h is the welding torch standoff height, and $\beta$ is a bending angle of the bent conducting rod; in Step ④, the groove width change determination threshold $TH_w \leq 0.5$ mm, and the swing angle $\alpha_i = 2 \arcsin\{(\overline{A_iB_i} - 2g)/2r\}$.

8. The adaptive control method according to claim 2, wherein: an ordinate value of a detection point of the distance $L_{2i}$ from the left edge line of the groove to the left boundary of the global image is the same as an ordinate value of a detection point of the distance $L_{1i}$ from the right edge line of the groove to the left boundary of the global image, and the ordinate value is a median or mean of detection values at m positions on the left and right edge lines of the groove in the left and right image capture windows of the groove, wherein $m \geq 1$.

9. The adaptive control method according to claim 2, wherein: when a small window image captured by the image capture window is processed, median filtering is performed first; then a gray-scale analysis is performed on the global image, to automatically search for peak and valley points of gray-scale distributions of a welding pool image and a background image and determine a threshold point; adaptive threshold segmentation processing is performed on the full window image using an Otsu method, and finally, the edge lines of the groove are extracted by using a Canny edge detection operator; when the global welding image is processed, median filtering and contrast stretching processing are employed first; next, the contour of the arc area is extracted after global fixed threshold segmentation is performed on the welding image; then, after morphological corrosion processing is performed on the contour of the arc area, position coordinates of the highest point of the arc area are extracted.

10. The adaptive control method according to claim 2, wherein: it is recognized and determined, according to the arc photographing and image acquisition triggering signal $P_A$ or an horizontal ordinate value of the highest point of the arc area, whether the arc is deviated towards the left or the right side wall of groove, or is at the center of the groove.

* * * * *

UNITED STATES PATENT AND TRADEMARK OFFICE
CERTIFICATE OF CORRECTION

PATENT NO. : 10,870,162 B2
APPLICATION NO. : 15/534005
DATED : December 22, 2020
INVENTOR(S) : Jiayou Wang et al.

Page 1 of 1

It is certified that error appears in the above-identified patent and that said Letters Patent is hereby corrected as shown below:

On the Title Page

Item (73), correct the citizenship of the Assignee from "Zhenjiang(HK)" to --Zhenjiang(CN)--

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*